(12) United States Patent
Ardis et al.

(10) Patent No.: US 8,645,735 B1
(45) Date of Patent: Feb. 4, 2014

(54) METHOD FOR LOWERING POWER CONSUMPTION IN SECURE DEVICES

(71) Applicant: Maxim Integrated Products, Inc., San Jose, CA (US)

(72) Inventors: Kristopher Leigh Ardis, Trabuco Canyon, CA (US); Tangkwai Ma, Plano, TX (US); Sung Ung Kwak, Frisco, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/666,402

(22) Filed: Nov. 1, 2012

(51) Int. Cl.
*G06F 1/26* (2006.01)
*G06F 12/14* (2006.01)
*G08C 17/00* (2006.01)
*G08B 13/00* (2006.01)
*G06F 7/00* (2006.01)
*H04L 9/00* (2006.01)

(52) U.S. Cl.
USPC ........... 713/320; 713/194; 370/311; 340/541; 707/812; 380/44

(58) Field of Classification Search
USPC ...................... 713/320, 194; 380/44; 370/311; 340/541; 707/812
See application file for complete search history.

(56) References Cited

U.S. PATENT DOCUMENTS

| 7,028,014 B1 * | 4/2006 | Naclerio ...................... 705/401 |
| 8,278,870 B2 * | 10/2012 | Little ............................ 320/106 |
| 2010/0306559 A1 * | 12/2010 | Ewing et al. ................ 713/300 |
| 2011/0246769 A1 * | 10/2011 | Wilson et al. ................ 713/168 |

* cited by examiner

*Primary Examiner* — Techane Gergiso
(74) *Attorney, Agent, or Firm* — North Weber & Baugh LLP

(57) ABSTRACT

The invention relates to a secure device, and more particularly, to systems, devices and methods of reducing power consumption of the secure device by limiting the amount of secure volatile memory that needs to be supplied by a battery. In a transport power mode, a sensitive data originally stored in a volatile memory is backed up in an encrypted format to a non-volatile memory, such that none or only a small area of the secure volatile memory has to be retained and powered by the battery for preserving cryptographic keys that are used to backup and recover the sensitive data. This secure device is applied in high security applications such as secure financial terminals.

20 Claims, 6 Drawing Sheets

200

400

600

METHOD FOR LOWERING POWER CONSUMPTION IN SECURE DEVICES

BACKGROUND

A. Technical Field

The present invention relates to a secure device, and more particularly, to systems, devices and methods of reducing power consumption of the secure device by limiting the amount of secure volatile memory that needs to be supplied by a battery. This secure device is used in high security applications such as financial terminals.

B. Background of the Invention

Nowadays, nearly all financial transactions are implemented based on cash exchanges at bank or sales counters, automatic teller machine (ATM) transaction, credit card payments via a specialized card reader, or internet transactions based on a generic computer or mobile device. Secure devices have been applied in the ATMs and the specialized card readers to provide an enhanced security level to the financial transactions. As the mobile devices become widely accepted and used as convenient financial terminals, secure device technologies start to be adopted and will gradually become a must for mobile devices as well.

Secure devices in these financial terminals must use batteries in their idle state when an external power source is not available. Battery power is used to secure memory storage, monitor any tamper attempt, and sometimes, to maintain a real-time clock (RTC). FIG. 1 illustrates a battery-backed sub-system 100 in an existing secure device. Cryptographic keys and sensitive data are loaded to a secure memory 104 at the manufacturer's site, and part of the secure memory 104 has to be powered to avoid data loss. While it is powered by the external power source 110 under normal operation conditions, the part of the secure memory 104 has to switch to the battery 102 for power in the idle state via the switch 109. At the same time, a tamper detection circuit 106 has to be enabled to detect any tamper attempt to read or compromise the secure memory 104. Therefore, even when the secure device 100 does not actively process any transaction in the idle state, battery power must be sustained to drive the secure memory 104 and the corresponding tamper detection circuit 106.

A long battery life is required to accommodate storage, shipping and potentially harsh storage/shipping conditions. These financial terminals could spend a long period of time sitting on warehouse shelves prior to being deployed to an end customer. Some terminals are mainly provided in lease arrangements where the terminals have to be disconnected for an unspecified period of time and transferred among customers and warehouses at different locations. During the course of storage or transportation, the secure volatile memory 104 and the tamper detection circuit 106 actively drain the battery 102. Sometimes, storage conditions may be harsh at a high temperature, accelerating battery consumption even more. The battery may be depleted before the financial terminals are delivered to their customers and plugged in to an external power source (for example, mains or a larger rechargeable battery). To address these concerns, battery life has to be extended by increasing the battery capacity to accommodate the unpredictable shelf time and conditions.

In the idle state, the battery-backed secure memory 104 consumes much more power than the tamper detection circuit 106 or the RTC 108. The tamper detection circuit 106 is controlled to sample intermittently, reducing overall power consumption. Despite its large consumption, the RTC 108 may be disabled during storage or shipment. However, the battery-backed secure memory 104 has to be constantly sustained by the battery power. As the silicon process feature size shrinks and the processing speed increases, significant increases are overseen in dynamic power consumption and leakage current of the secure memory 104. The limited capacity of the battery may quickly be depleted by this secure memory 104.

Batteries used in financial terminals are typically coin cells, such as CR2450. Unfortunately, a rechargeable battery is not desirable for this application, because it cannot support a shelf life of several years. Once the battery is completely drained, a financial terminal has to be returned to the manufacturer to be reworked or scrapped. Therefore, a need exists to extend the battery life.

SUMMARY OF THE INVENTION

Various embodiments of the present invention relate to a secure device, and more particularly, to systems, devices and methods of reducing power consumption of the secure device by limiting the amount of secure volatile memory that needs to be constantly supplied by a battery. In a transport power mode, sensitive data in a volatile memory is backed up in an encrypted format within a non-volatile memory, such that none or only a small area of the secure volatile memory has to be retained and powered by the battery for preserving cryptographic keys that are used to recover the sensitive data.

One aspect of the invention is a secure device that comprises a key generator, an encryption engine, a volatile memory and a non-volatile memory. The volatile memory is segmented to a non-retained volatile memory and a retained volatile memory, both requiring power for data storage. When the secure device relies on the battery to provide power in a transport power mode, a sensitive data stored in the non-retained volatile memory is encrypted using an encryption key stored in the retained volatile memory. The encrypted sensitive data is backed up in the non-volatile memory, and only the retained volatile memory has to be supplied by a battery in this transport power mode.

One aspect of the invention is a method of securely preserving sensitive data in a transport power mode. An external power source is decoupled and replaced with a battery. An encryption key is stored in a retained volatile memory and used to encrypt the sensitive data based on the encryption key. The sensitive data is originally stored in a non-retained volatile memory that also requires power for data storage, and further backed up in an encrypted format within a non-volatile memory. Hence, the battery may be decoupled from the non-retained volatile memory, and battery life is increased by not supplying both non-retained and retained volatile memory.

One aspect of the invention is another method of securely preserving a sensitive data in a transport power mode. As a power supply is decoupled and replaced with a battery, an encryption key is generated based on inherent differences among a plurality of physically uncloneable elements. This encryption key is used to encrypt the sensitive data for backup in a non-volatile memory. The battery may be decoupled from the volatile memory, and power is preserved in this transport power mode.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to a secure device, and more particularly, to systems, devices and methods of reducing power consumption of the secure device by limiting the amount of secure volatile memory that needs to be driven by a battery in a transport power mode. In addition to a normal operation mode powered by an external power source, the secure device also functions in a transport power mode when it relies on a battery to sustain its operation and becomes sensitive to power consumption. Sensitive data originally stored in a volatile memory is backed up in an encrypted format within a non-volatile memory, and only a small area in the secure volatile memory is reserved to store the corresponding cryptographic keys. In the transport power mode, the small area in the volatile memory is retained and powered by the battery for preserving corresponding encryption keys. When the secure device returns to the normal operation mode, the sensitive data is recovered from the encrypted data based on the encryption keys, and stored back to the volatile memory.

Figure 1:
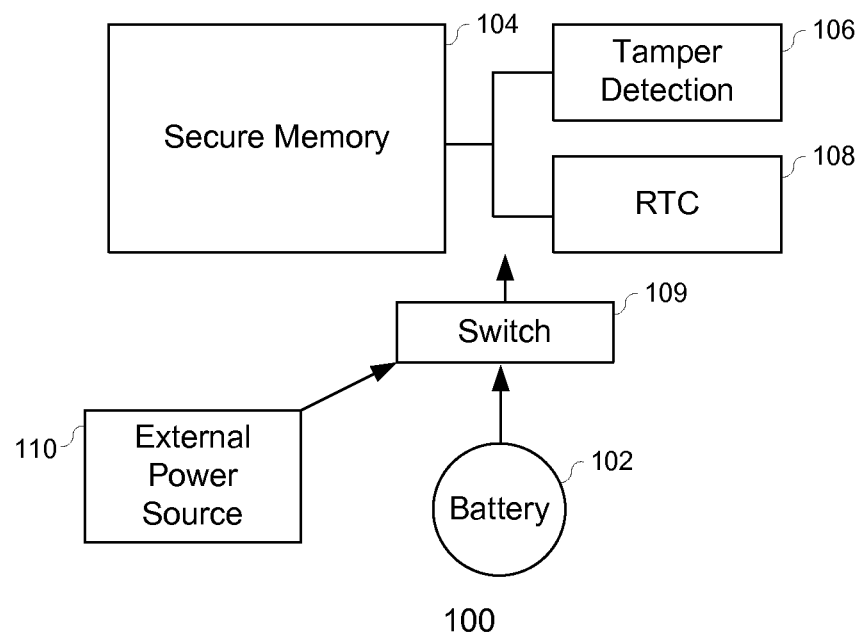
FIG. 1 illustrates a battery-backed sub-system in an existing secure device.
Figure 2:
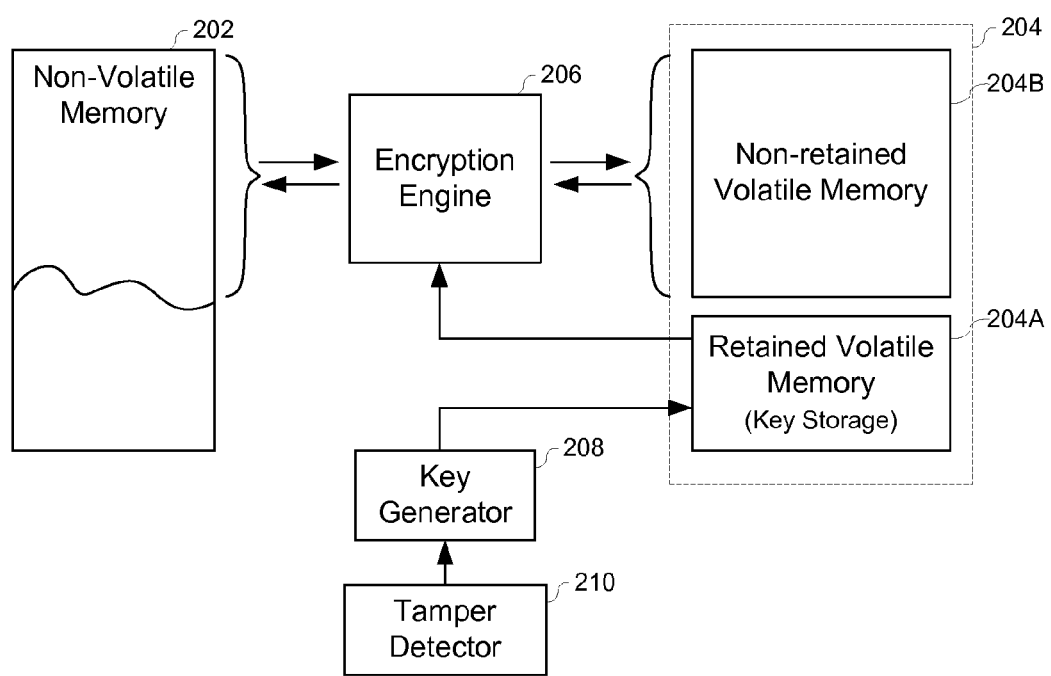
FIG. 2 illustrates an exemplary block diagram of a secure device based on a segmented volatile memory according to various embodiments of the invention.

FIG. 2 illustrates an exemplary block diagram 200 of a secure device based on a segmented volatile memory according to various embodiments of the invention. The secure device 200 comprises both non-volatile memory 202 and a volatile memory 204. The non-volatile memory 202 is relatively less secure than the volatile memory 204, but preserves data regardless of its power state. In contrast, the volatile memory 204 requires a power supply to maintain its content and may offer an enhanced security level. This volatile memory 204 is further segmented to a retained volatile memory 204A and a non-retained volatile memory 204B. In the transport power mode, a battery is coupled to power only the retained volatile memory 204A among memories 202, 204A and 204B.

The secure device 200 further comprises an encryption engine 206 and a key generator 208. The key generator 208 generates an encryption key, and this encryption key is stored in the retained volatile memory 204A. The encryption engine 206 is coupled to the retained volatile memory 204A, and extracts the encryption key. A sensitive data is originally stored in the non-retained volatile memory 204B in a normal operation mode. In the transport power mode, the sensitive data is extracted from the memory 204B, and encrypted in the encryption engine 206 according to an encryption algorithm using the encryption key. The encrypted sensitive data may be further stored in the non-volatile memory 202.

In the transport power mode, the power supply to the memory may be disconnected and potentially impact the data stored in the memory. The encryption key is securely stored in the retained volatile memory 204A which is powered by the battery. The encrypted sensitive data is preserved within the non-volatile memory 202, while the sensitive data in the non-retained volatile memory 204B is released due to loss of power. Regardless, this non-retained volatile memory 204B is still used to store device data, program codes and parameters in the normal operation mode, except that any data that needs to be preserved has to be transferred to the non-volatile memory 202 once the transport power mode is enabled.

As the secure device 200 returns to the normal power mode, the encryption engine 206 may recover the encrypted sensitive data from the non-volatile memory 202 to the original sensitive data. Such data recovery relies on the encryption key that is preserved in the retained volatile memory 204A, and follows a decryption algorithm that is corresponding to its original encryption algorithm.

In various embodiments of the invention, the secure device 200 incorporates a tamper detector 210 that detects any attempt to compromise or read the secure device. The tamper detector 210 may be implemented based on several monitoring circuits, for example on switches that indicate that the device enclosure was breached, on a security mesh that is embedded in a security microcontroller package, on voltage monitors, or on a low temperature sensor. The retained volatile memory 204A is coupled to the tamper detector 210. Once a tamper attempt is detected, the encryption key is erased from the retained volatile memory 204A.

In the transport power mode, power consumption by the memories is reduced by preserving the retained volatile memory 204A, rather than the entire volatile memory 204. Memory space required for storing the encryption key is much smaller than that for storing the sensitive data, so the size of the retained volatile memory 204A may be only a small fraction of the size of the non-retained volatile memory 204B. In one embodiment, the retained volatile memory 204A is merely a 128 bit memory, while the non-retained volatile memory 204B needs 64 KByte to store all the sensitive device data, program codes and parameters. Power consumption due to leakage is proportional to the size of the memory, and the retained volatile memory 204A consumes much less power than the non-retained volatile memory 204B. As a result, the power consumption by the memory 204 is effectively reduced, and the battery life is extended by selectively retaining the volatile memory 204A rather than the entire volatile memory 204.

Figure 3:
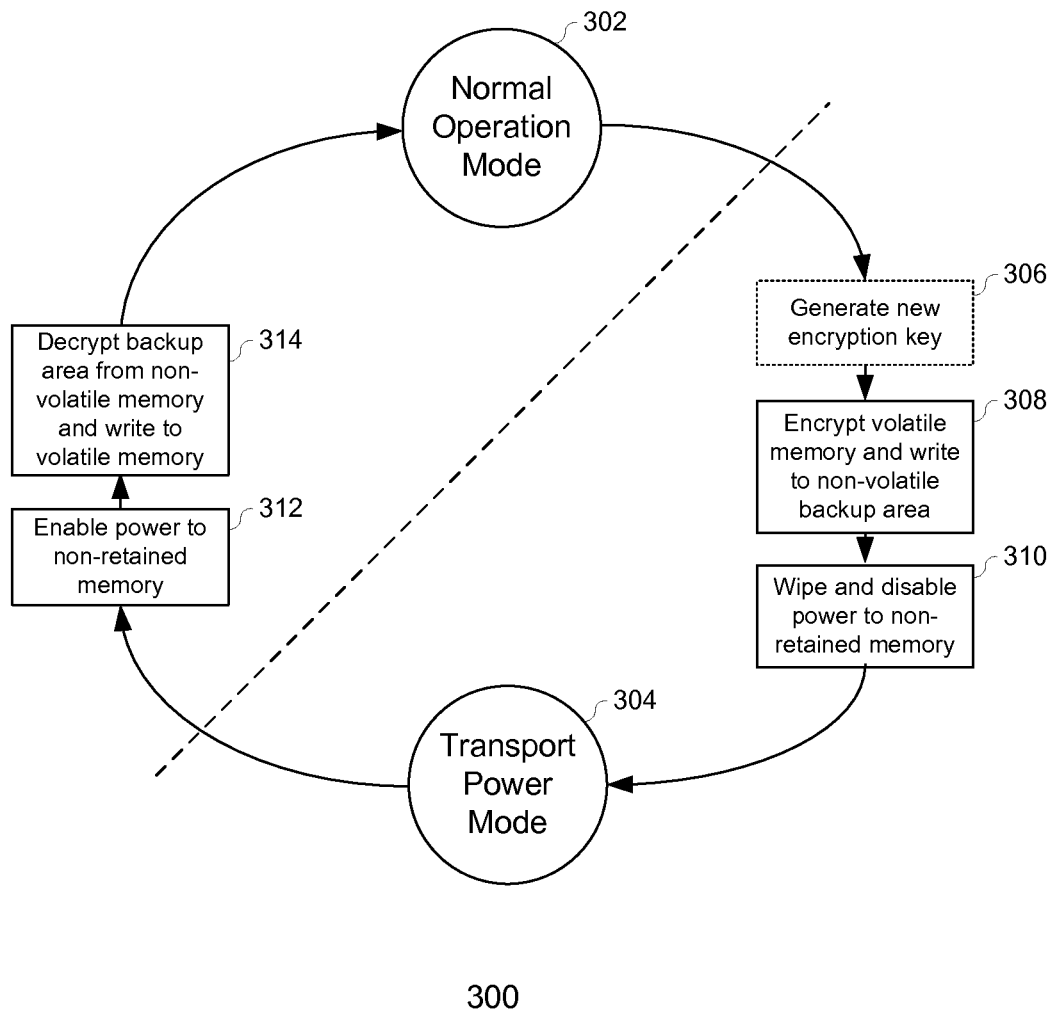
FIG. 3 illustrates an exemplary flow chart of a method for reducing power consumption of a secure device that is based on a segmented volatile memory according to various embodiments of the invention.

FIG. 3 illustrates an exemplary flow chart 300 of a method for reducing power consumption of a secure device 200 that is based on a segmented volatile memory 204 according to various embodiments of the invention. The secure device 200 may alternate between a normal operation mode 302 and a transport power mode 304 that are powered by an external power source and a battery, respectively. A secure memory in the secure device comprises a non-volatile memory 202 and a volatile memory 204, and the volatile memory 204 is further partitioned to separate out a retained volatile memory 204A that may be still powered by the battery in the transport power mode.

When the secure device 200 enters the transport power mode 304, data in the non-retained volatile memory 204B is encrypted and stored in the non-volatile memory 202. At step 306, at least one encryption key is generated and stored in the retained volatile memory 204A. One example of the encryption key is a 128 bit key in compliance with the Advanced Encryption Standard (AES). In some embodiments, the encryption key may have already been prepared and stored within the memory 204A, before the transport power mode 304 is enabled.

In various embodiments of the invention, the encryption key is also used as a transport locking key to lock the secure device 200 in the transport power mode 304. The encryption key is used to disable many functions of the secure device 200, until a cryptographic challenge, e.g., authentication, happens. For example, a manufacturer may chose to lock the device until it is provisioned at a customer's site after receiving payment. When locked, the value of the device would be much reduced should it be stolen during transport or from storage.

At step 308, the encryption key is used to encrypt sensitive data stored in the non-retained volatile memory 204B according to an encryption algorithm, and the encrypted sensitive data is further stored and backed up in the non-volatile memory 202. In various embodiments of the invention, the non-volatile memory 202 may be a Flash memory, an Electrically Erasable Programmable Read-Only Memory (EEPROM), a Ferroelectric Random Access Memory (FRAM), or a Phase Change Random Access Memory (PRAM). This non-volatile memory 202 may be monolithically incorporated on the integrated circuit (IC) of the secure device 200, or integrated with the secure device 200 on a printed circuit board package. In one embodiment, the non-volatile memory 202 is located remotely over a network, and the encrypted sensitive data has to be communicated via the network for storage in the memory 202.

At step 310, the battery is disabled from all memories except the retained volatile memory 204A. On one hand, the retained volatile memory 204A is supplied by the battery, and maintains its storage of the encryption key. On the other hand, the battery is decoupled from the non-retained volatile memory 204B, and the original sensitive data is wiped from the volatile memory 204B. Therefore, the battery is only used to power the retained volatile memory 204A, rather than the entire volatile memory 204, and power consumption is reduced when the secure device operates in this transport power mode 304.

When the secure device 200 returns to the normal operation mode 302, the sensitive data is recovered and stored back to the non-retained volatile memory 204B. At step 312, the non-retained volatile memory 204B is powered up by recoupling it to a power source. At step 314, the encrypted sensitive data stored in the non-volatile memory 202 is decrypted using the encryption key based on a corresponding decryption algorithm. The sensitive data is stored back to the non-retained volatile memory 204B.

The secure device 200 may switch from the normal operation mode 302 to the transport power mode 304 based on an activity level, environmental conditions or certain specific events. In one embodiment, the secure device 200 monitors the activity level of the financial terminal. The secure device 200 comprises a real-time clock, and is programmed to another normal battery backed mode upon no activity. In this normal battery backed mode, the entire volatile memory 204 is driven by the battery to preserve both the encryption key and the sensitive data. However, if activity is absent after a certain number of days, the secure device 200 is controlled to enter the transport power mode 304, conserving battery power by disabling the non-retained volatile memory 204B.

In another embodiment, the transport power mode 304 is automatically enabled to avoid increased power consumption, when the temperature of the ambient surrounding the secure device 200 exceeds a threshold, e.g., 45° C. In particular, more efficient control is enabled as both the temperature and the activity level are applied to enable the transport power mode 304. At a high ambient temperature, a shorter activity timeout is demanded prior to enabling the transport power mode 304 to avoid draining the battery too fast.

In some embodiments, the transport power mode 304 is enabled upon a specific event, and one exemplary event is that a counter terminal or an ATM pin pad loses main power. To further preserve the battery life, these terminals may rely on a super-capacitor or other power reservoir to temporarily replace the main power, and during this short grace period, the sensitive data in the non-retained volatile memory 204B may be encrypted and backed up to the non-volatile memory 202.

Despite reduction in power consumption, the secure device 200 still requires a small amount of current that is used by the retained volatile memory 204A to preserve the encryption key in the transport power mode 304. This is largely due to the fact that the conventional volatile memory 204A cannot operate without a power supply. In various embodiments of the invention, physically uncloneable elements (PUE) are applied to store the encryption keys, and no power consumption is needed to maintain storage of the key in the PUEs. As a result, the battery does not need to supply any memory in the secure device that operates in the transport power mode.

Inherent differences in PUE characteristics are used to generate the encryption keys. Regardless of how well semiconductor processes are managed, subtle physical differences are unavoidable among semiconductor devices in a single die and among semiconductor dies located at different locations across a wafer. These differences originate from non-uniformity and small imprecisions in lithography and wafer processing steps, even though the devices or dies are intended to be identical. As a result, each physical element demonstrates its specificity for its electrical, mechanical, magnetic, chemical and other properties. For instance, two otherwise identical capacitors might differ by 0.1% in capacitance due to difference in dielectric thickness and plate area. The thickness difference may be caused by variation in a dielectric formation step, while the plate area difference results from variations in lithography or etching. Such inherent differences are desirable for generating the encryption keys for the secure device 400, although semiconductor design normally strives to minimize these differences and guarantee that performance of the end product is controlled within a certain tolerance.

The inherent differences among these PUEs are utilized here to generate statistically random numbers that are unique, non-duplicable and repeatable. These PUEs do not need power to maintain their inherent differences, and the random numbers are recovered from the inherent differences using a random number generator. In one embodiment, an inherent difference between two capacitors is accumulated over a short duration, and amplified to determine a corresponding bit of "1" or "0." Such random numbers/bits may be applied as encryption keys in this invention. An exemplary implementation for a PUE-based key generator is described in detail in U.S. Patent Application No. 61/707,792, filed Sep. 28, 2012, entitled "System and Method with Specific Ordered Execution over Physical Elements."

Figure 4:
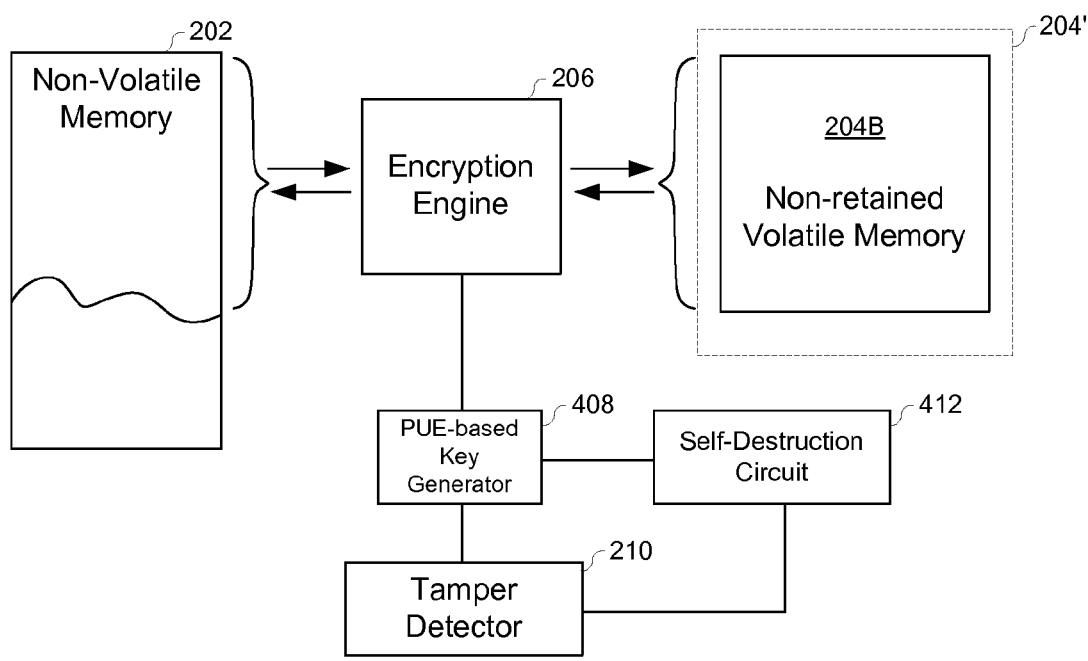
FIG. 4 illustrates an exemplary block diagram of a secure device based on physically uncloneable elements (PUE) according to various embodiments of the invention.

FIG. 4 illustrates an exemplary block diagram 400 of a secure device based on PUEs according to various embodiments of the invention. The secure device 400 comprises a non-volatile memory 202, a volatile memory 204', an encryption engine 206, and a PUE-based key generator 408. Distinct from that in the secure device 200, the volatile memory 204' does not include a retained volatile memory 204B, and the entire volatile memory 204' may be decoupled from the battery in the transport power mode. Since the volatile memory 204' is the primary consumer of battery power, such an arrangement may not only prolong the shelf and storage life of the secure device 400, but also allow use of smaller and less expensive battery.

Sensitive data stored in the volatile memory 204' is encrypted in the encryption engine 206 using an encryption key generated by the PUE-based key generator 408, and this key is derived from the inherent differences of the PUEs integrated in the secure device 400. In various embodiments, these PUEs may be implemented as resistors, capacitors, inductors, or transistors. The encrypted sensitive data are further backed up in the non-volatile memory 202.

In certain embodiments, the secure device 400 further incorporates a tamper detector 210 and a self-destruction circuit 412, both coupled to the PUEs. The tamper detector 210 detects a tamper attempt to the secure device 400 including the PUEs. Once a tamper attempt is detected, the self-destruction circuit 412 is enabled to destroy the PUEs irreversibly. For instance, for capacitive PUEs, a large bias is generated to break down the dielectrics in the capacitors.

Figure 5:
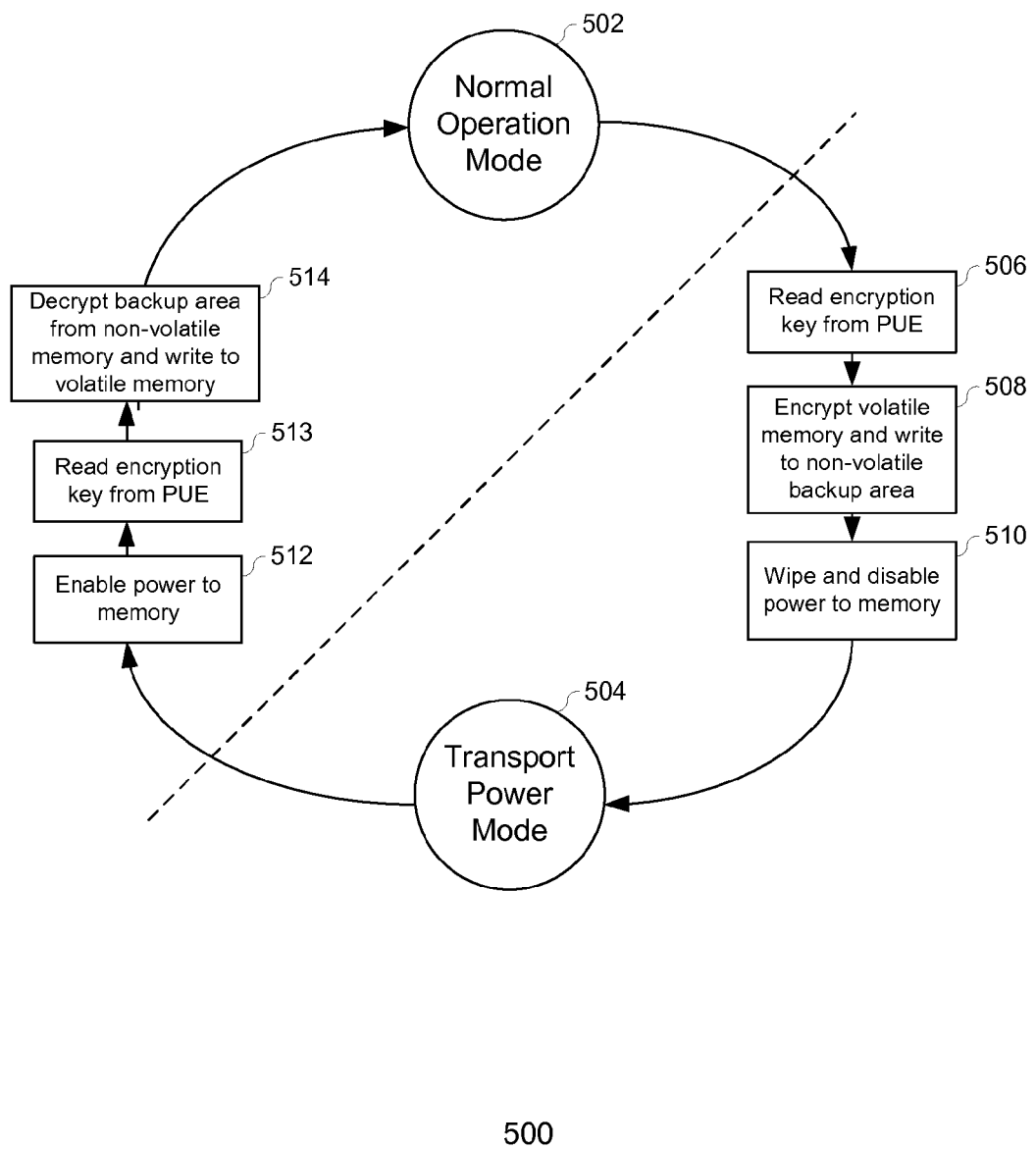
FIG. 5 illustrates an exemplary flow chart of a method for reducing power consumption of a PUE-based secure device according to various embodiments of the invention.

FIG. 5 illustrates an exemplary flow chart 500 of a method for reducing power consumption of a PUE-based secure device 400 according to various embodiments of the invention. The secure device 400 may alternate between a normal operation mode 502 and a transport power mode 504 that are powered by an external power source and a battery, respectively. A secure memory in the secure device 400 comprises a non-volatile memory 202 and a volatile memory 204', both being decoupled from the battery in the transport power mode 504.

When the secure device 400 enters the transport power mode 504, data in the volatile memory 204' is encrypted and backed up to the non-volatile memory 202. At step 506, at least one encryption key is extracted from the PUEs using the PUE-based key generator 408. At step 508, the encryption key is used to encrypt sensitive data stored in the volatile memory 204' according to an encryption algorithm, and the encrypted sensitive data is further stored and backed up to the non-volatile memory 202. At step 510, the battery is decoupled from all memories including the volatile memory 204'. Prior to step 510, the encryption key generated at step 506 may be temporarily stored in a register, but is released at step 510 to conserve power consumption by the register.

When the secure device 200 returns to the normal operation mode 502, the sensitive data is recovered and stored back to the volatile memory 204'. At step 512, the secure device 400 is recoupled to a power source, and the volatile memory 204' is powered up. At step 513, the encryption key is recovered from the PUEs using the PUE-based key generator 408. Since the encryption key is based on the inherent differences among the PUEs, the recovered encryption key is consistent with the original key used for previous data encryption. At step 514, the encrypted sensitive data stored in the non-volatile memory 202 is decrypted using the encryption key based on a corresponding decryption algorithm. The sensitive data is thus stored back to the volatile memory 204'.

Figure 6:
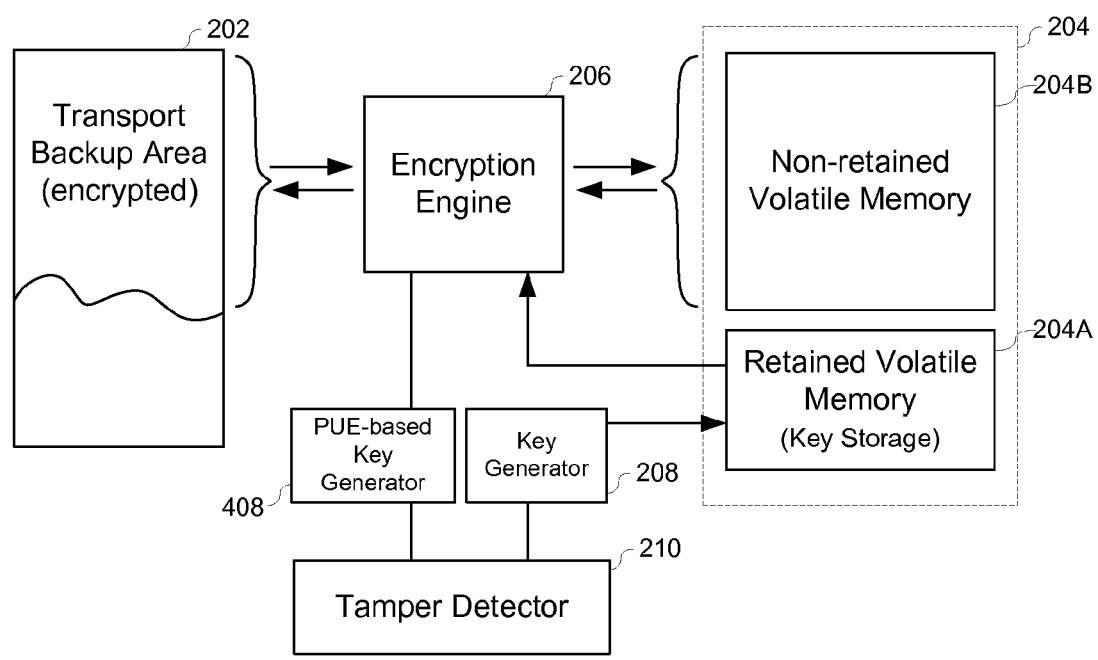
FIG. 6 illustrates an exemplary block diagram of a secure device based on both PUEs and conventional encryption keys according to various embodiments of the invention.

FIG. 6 illustrates an exemplary block diagram 600 of a secure device based on both PUEs and conventional encryption keys according to various embodiments of the invention. The secure device 600 combines the secure devices 200 and 400 for increased security. This volatile memory 204 is further segmented to a retained volatile memory 204A and a non-retained volatile memory 204B. Although the PUE-based encryption key does not require a volatile memory for key storage, the retained volatile memory 204A is reserved to store the conventional encryption keys. In the transport power mode, a battery is coupled to drive only this retained volatile memory 204A among all the memories 202, 204A and 204B.

In one embodiment, the encryption key provided by the retained volatile memory 204A and the encryption key generated from the PUEs are combined using a mixing function, such as XOR, to derive the final encryption key. In the transport power mode, this final encryption key is used to encrypt the sensitive data in the non-retained volatile memory 204B for backup to the non-volatile memory 202. Similarly, in the normal operation mode, this final encryption key is obtained to recover the encrypted data from the non-volatile memory 202 and store it back to the non-retained volatile memory 204B.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:
1. A secure device, comprising:
a volatile memory that is segmented into a non-retained volatile memory and a retained volatile memory, both non-retained and retained volatile memories requiring power for data storage, the non-retained volatile memory being decoupled and the retained volatile memory being coupled to a battery when the secure device relies on the battery to provide power in a transport power mode;

a first key generator, coupled to the retained volatile memory, the first key generator generating a first encryption key that is stored in the retained volatile memory; and an encryption engine, coupled to the volatile memory, the encryption engine encrypting a sensitive data stored in the non-retained volatile memory based on the first encryption key; and a non-volatile memory, coupled to the encryption engine, the non-volatile memory backing up the encrypted sensitive data in the transport power mode.

2. The secure device according to claim 1, further comprising a tamper detector that detects a tamper attempt, the first encryption key being erased from the retained volatile memory once the tamper attempt is detected.

3. The secure device according to claim 1, wherein when the secure device returns to a normal operation mode powered by an external power source, the first encryption key is extracted from the retained volatile memory to restore the encrypted sensitive data in the non-volatile memory to the sensitive data.

4. The secure device according to claim 1, wherein the non-volatile memory is located remotely over a network, and the encrypted sensitive data is communicated via the network for storage in the non-volatile memory.

5. The secure device according to claim 1, wherein the transport power mode is enabled according to an activity level of the secure device.

6. The secure device according to claim 1, wherein the transport power mode is enabled according to ambient temperature.

7. The secure device according to claim 1, wherein the transport power mode is enabled at an event of losing a main power.

8. The secure device according to claim 1, further comprising a second key generator, the second key generator incorporating a plurality of physically uncloneable elements (PUEs) and generating a second encryption key based on inherent differences among the plurality of PUEs, the encryption engine selecting one key from the first and second encryption keys to encrypt the sensitive data.

9. A method for securely preserving a sensitive data in a transport power mode, comprising the steps of:
    entering the transport power mode by replacing a power supply with a battery;
    storing an encryption key in a retained volatile memory, where the retained volatile memory requires power for data storage;
    encrypting the sensitive data based on the encryption key, the sensitive data being stored in a non-retained volatile memory that also requires power for data storage;
    backing up the encrypted sensitive data in a non-volatile memory; and
    decoupling the battery from the non-retained volatile memory, such that the battery power is preserved by driving the retained volatile memory rather than both non-retained and retained volatile memory.

10. The method according to claim 9, further comprising the step of monitoring a tamper attempt using a tamper detector, the encryption key being erased from the retained volatile memory once the tamper attempt is detected.

11. The method according to claim 9, wherein a normal operation mode is enabled when an external power source is coupled, the encryption key being extracted from the retained volatile memory to restore the encrypted sensitive data in the non-volatile memory to the sensitive data.

12. The method according to claim 9, wherein the non-volatile memory is located remotely over a network, and the encrypted sensitive data is communicated via the network for storage in the non-volatile memory.

13. The method according to claim 9, wherein the transport power mode is enabled according to an activity level.

14. The method according to claim 9, wherein the transport power mode is enabled at an event of losing main power.

15. A method for securely preserving a sensitive data in a transport power mode, comprising:
    entering the transport power mode by replacing a power supply with a battery;
    generating an encryption key based on inherent differences among a plurality of physically uncloneable elements (PUEs);
    encrypting the sensitive data using the encryption key, the sensitive data being stored in a volatile memory that requires power for data storage;
    storing the encrypted sensitive data in a non-volatile memory;
    decoupling the battery from the volatile memory, such that the battery power is preserved from driving the volatile memory.

16. The method according to claim 15, further comprising the step of monitoring a tamper attempt using a tamper detector, the PUEs being coupled to a self-destruction circuit and being destroyed irreversibly once the tamper attempt is detected.

17. The method according to claim 15, wherein a normal operation mode is enabled when an external power source is coupled, the encryption key being regenerated from the plurality of PUEs and used to restore the encrypted sensitive data in the non-volatile memory to the sensitive data.

18. The method according to claim 15, wherein the non-volatile memory is located remotely over a network, and the encrypted sensitive data is communicated via the network for storage in the non-volatile memory.

19. The method according to claim 15, wherein the transport power mode is enabled according to an activity level.

20. The method according to claim 15, wherein the plurality of PUEs is selected from a group consisting of capacitors, resistors and transistors.

* * * * *